US008089235B2

(12) United States Patent
Morino et al.

(10) Patent No.: US 8,089,235 B2
(45) Date of Patent: Jan. 3, 2012

(54) ELECTRIC DRIVER UNIT

(75) Inventors: Seiji Morino, Nagoya (JP); Takaharu Kozawa, Konan (JP)

(73) Assignee: Denso Corporation, Kariya (JP)

( * ) Notice: Subject to any disclaimer, the term of this patent is extended or adjusted under 35 U.S.C. 154(b) by 396 days.

(21) Appl. No.: 12/504,119

(22) Filed: Jul. 16, 2009

(65) Prior Publication Data

US 2010/0019712 A1    Jan. 28, 2010

(30) Foreign Application Priority Data

Jul. 25, 2008    (JP) ................................ 2008-191805

(51) Int. Cl.
*H02P 7/00* (2006.01)
(52) U.S. Cl. ..................... 318/432; 318/434; 123/90.15; 123/90.19
(58) Field of Classification Search .................. 318/432, 318/434, 473, 478; 123/90.15, 90.17, 90.19
See application file for complete search history.

(56) References Cited

U.S. PATENT DOCUMENTS

| | | | | |
|---|---|---|---|---|
| 5,235,954 A | * | 8/1993 | Sverdlin | 123/447 |
| 5,562,071 A | * | 10/1996 | Urushihata et al. | 123/90.15 |
| 5,680,834 A | * | 10/1997 | Szpak et al. | 123/90.15 |
| 6,371,066 B1 | * | 4/2002 | Cullen | 123/90.15 |
| 6,516,658 B1 | * | 2/2003 | McCoy et al. | 73/114.45 |
| 6,622,678 B2 | | 9/2003 | Shimizu et al. | |
| 6,953,013 B2 | | 10/2005 | Tani | |
| 7,021,568 B2 | * | 4/2006 | Rieger et al. | 239/585.1 |
| 7,121,240 B2 | | 10/2006 | Tani | |
| 2005/0206254 A1 | | 9/2005 | Tsuge et al. | |

FOREIGN PATENT DOCUMENTS

| | | |
|---|---|---|
| JP | 2003-003900 | 1/2003 |
| JP | 2005-73356 | 3/2005 |
| JP | 2005-073356 | 3/2005 |
| JP | 2005-133708 | 5/2005 |
| JP | 2005-140105 | 6/2005 |
| JP | 2005-269875 | 9/2005 |
| JP | 2005-348535 | 12/2005 |
| JP | 2006-037837 | 2/2006 |
| JP | 2006-37837 | 2/2006 |

OTHER PUBLICATIONS

Japanese Office Action dated May 7, 2010, issued in corresponding Japanese Application No. 2008-191805, with English translation.

* cited by examiner

*Primary Examiner* — Rina Duda
(74) *Attorney, Agent, or Firm* — Nixon & Vanderhye, PC

(57) ABSTRACT

An electric driver unit for an electric valve timing adjusting apparatus is disclosed. The electric driver unit includes: a motor for driving the apparatus; a switching part for applying a drive voltage to the motor; a current information output part for providing current information associated with a current flowing in the switching part; a power distribution control part for controlling power distribution to the motor by controlling the switching part; and an oil temperature information output part for providing oil temperature corresponding value, which depends on temperature of oil that surrounds the apparatus. The power distribution control part controls the current based on the current information so that the current stays below a target value. The target value includes a normal value and a large value. The power distribution control part adopts the large value as the target value until the oil temperature corresponding value reaches a predetermined temperature.

8 Claims, 6 Drawing Sheets

ELECTRIC DRIVER UNIT

CROSS REFERENCE TO RELATED APPLICATION

The present application is based on Japanese Patent Applications No. 2008-191805 filed on Jul. 25, 2008, disclosure of which is incorporated herein by reference.

BACKGROUND OF THE INVENTION

1. Field of the Invention

The present invention relates to an electric driver unit for an electric valve timing adjusting apparatus that adjusts timing of opening and closing a valve of an internal combustion engine.

2. Description of Related Art

Internal combustion engines (referred to also as engine) for a vehicle are equipped with a valve timing adjusting apparatus, which adjusts timing of opening and closing a valve of the engine in accordance with a driving state of the engine. A valve timing adjusting apparatus adjusts a rotation phase of a camshaft relative to a crankshaft of the engine to an advanced angle or a retarded angle, and thereby changes the timing of opening and closing the valve in relation to rotation of the camshaft.

An electric valve timing adjusting apparatus driven by a motor is known as one type of valve timing adjusting apparatus. An electric valve timing adjusting apparatus employs a brushless motor capable of controlling the rotation phase with high accuracy. JP-2005-269875A corresponding to US patent application Ser. No. 2005/0206254 proposes an electric motor having a control circuit for driving the electric valve timing adjusting apparatus.

In general, a large current is required as a drive current of the motor for the electric valve timing adjusting apparatus because the large drive current can improve response performance of the electric valve timing adjusting apparatus. However, a flow of a large current to a circuit can bring a problem associated with heat generation. For example, since the circuit typically employs a MOSFET (metal-oxide-semiconductor field-effect transistor, which is one type of field effect transistors) as a switching element for switching voltage application direction, there arises a difficulty that the MOSFET generates a heat and the MOSFET may be damaged by the heat. When a circuit element operable at a large current is used, there arises another difficulty that a circuit board may increase in weight. For addressing the latter difficulty, JP-2006-37837A proposes a driver provided with a laminating structure of a circuit board for a control circuit.

From a viewpoint of suppressing the heat generation in a MOSFET, the drive current is conventionally controlled and maintained at a constant value by cutting power distribution to the motor. More specifically, the power distribution to the motor is temporarily cut when a value of a current flowing through a shunt resistor reaches a target current value. When the value of the current is decreased, the power is re-distributed to the motor. By repeatedly performing the above operations, the drive current is controlled and maintained at an approximately constant value so as not to exceed the target current value.

The inventors of the present application have however revealed that there is a difficulty in connection with the above described control of the drive current. For example, the response performance of the electric valve timing adjusting apparatus is worsened when an engine is cool. This is because the temperature of surrounding oil is a factor of worsening the response performance of the electric valve timing adjusting apparatus. After an engine is started, the response performance becomes low until the oil temperature rises above a certain level.

SUMMARY OF THE INVENTION

In view of the above and other difficulties, it is an objective of the present invention to provide an electric driver unit for an electric valve timing adjusting apparatus, the electric driver unit being capable of minimizing a difficulty associated with heat generation, and capable of suppressing a decrease in response performance of the electric valve timing adjusting apparatus, the decrease in response performance being related to temperature of oil that surrounds the electric valve timing adjusting apparatus.

According to an aspect of the present invention, there is provided an electric driver unit for an electric valve timing adjusting apparatus that adjusts timing of opening and closing a valve of an internal combustion engine of a vehicle by using a motor. The electric driver unit includes: a motor for driving the electric valve timing adjusting apparatus; a switching part for applying a drive voltage to the motor; a current information output part configured to provide current information, the current information being associated with a current flowing in the switching part; a power distribution control part configured to control power distribution to the motor by controlling the switching part; and an oil temperature information output part configured to provide oil temperature information, the oil temperature information corresponding to an oil temperature corresponding value, the oil temperature corresponding value depending on temperature of oil that surrounds the electric valve timing adjusting apparatus. The power distribution control part is configured to control the current flowing in the switching part by temporarily cutting the power distribution to the motor based on the current information provided from the current information output part, so that the current flowing in the switching part stays below a target current value. The target current value includes a normal current value and a predetermined large current value larger than the normal current value. The power distribution control part sets the target current value based on the oil temperature information provided from the oil temperature output part, such that the power distribution control part adopts the predetermined large current value as the target current value until the oil temperature corresponding value reaches a predetermined temperature.

According to the above electric driver unit, it is possible to minimize a difficulty associated with heat generation, and it is possible to suppress a decrease in response performance of the electric valve timing adjusting apparatus, the decrease in response performance being related to the temperature of the oil surrounding the electric valve timing adjusting apparatus.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Exemplary embodiments are described below with reference to the accompanying drawings.

Figure 1:
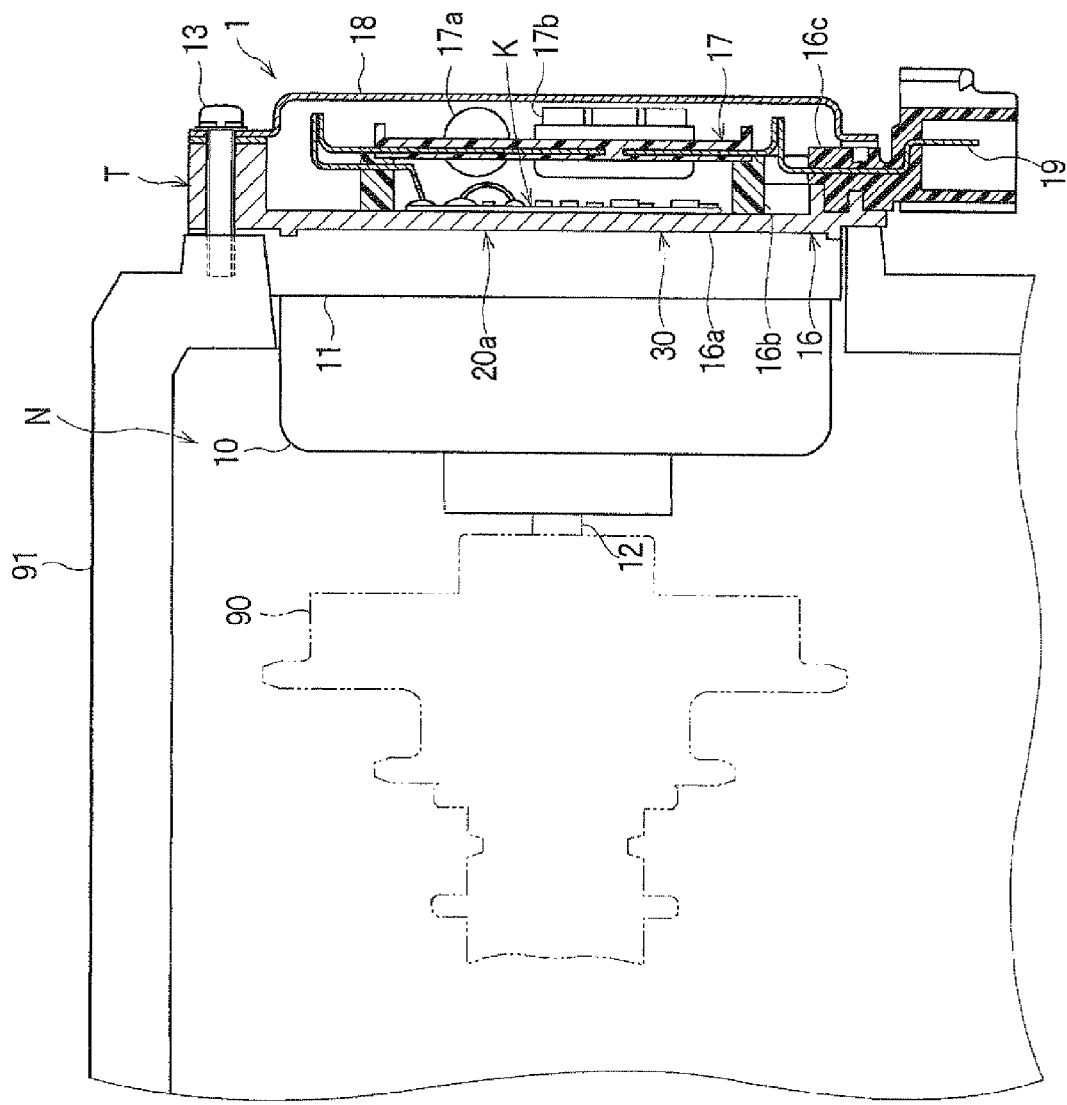
FIG. 1 is a diagram illustrating a structure of an electric driver unit in accordance with one embodiment.

As shown in FIG. 1, an electric driver unit (EDU) 1 according to one embodiment includes an electric motor 10 for an electric valve timing adjusting apparatus 90 equipped in an engine of a vehicle. The EDU 1 drives and controls the electric motor 10, so that the electric valve timing adjusting apparatus 90 can adjust valve timing of opening and closing an inlet valve or an exhaust valve by utilizing rotary torque of the electric motor 10. In FIG. 1, the electric valve timing adjusting apparatus 90 is illustrated by using the dashed-two dotted line. For simplicity, the electric valve timing adjusting apparatus is also referred to herein as an adjusting apparatus.

The electric motor 10 is, for example, a three-phase brushless motor, and includes a motor case 11 and a motor axis 12. The motor case 11 is fixed to an engine head 91 by using a bolt 13. The motor axis 12 is supported by the motor case 11 so as to be rotatable in a forward rotation direction and a reverse rotation direction. The motor axis 12 is integrated with a rotor (not shown). The rotor includes a circular disk member, on a surface of which a permanent magnet is bonded to form magnetic poles. A stator (not shown) accommodates the rotor and rotatably supports the rotor.

An electric circuit of the EDU 1 is distributed in two circuit board parts 16, 17, which are also referred to as a first circuit board part 16 and a second circuit board part 17. The first and second circuit board parts 16, 17 are fixed to each other so as to form a multilayer structure, and are attached to the motor case 11. The first circuit board part 16 includes a base 16a, a support wall 16b, and a connector 16c. The base 16a is made of metal such as aluminum and the like. Together with a cover 18, the base 16a is fixed to the engine head 91 by using the bolt 13. A bridge 20a of an inverter 20, and an integrated circuit (IC) 30, which will be described later, are mounted on the base 16a. The support wall 16b and the connector 16c are made of resin and are attached to the base 16a. A power supply terminal for establishing connection to an electric circuit is buried in the connector 16c by insert molding.

The second circuit board part 17 is made of resin and is supported by the support wall 16b of the first circuit board part 16. Electronic components 17a, 17b for an electric circuit, such as a capacitor and the like, are mounted on the second circuit board part 17.

Figure 2:
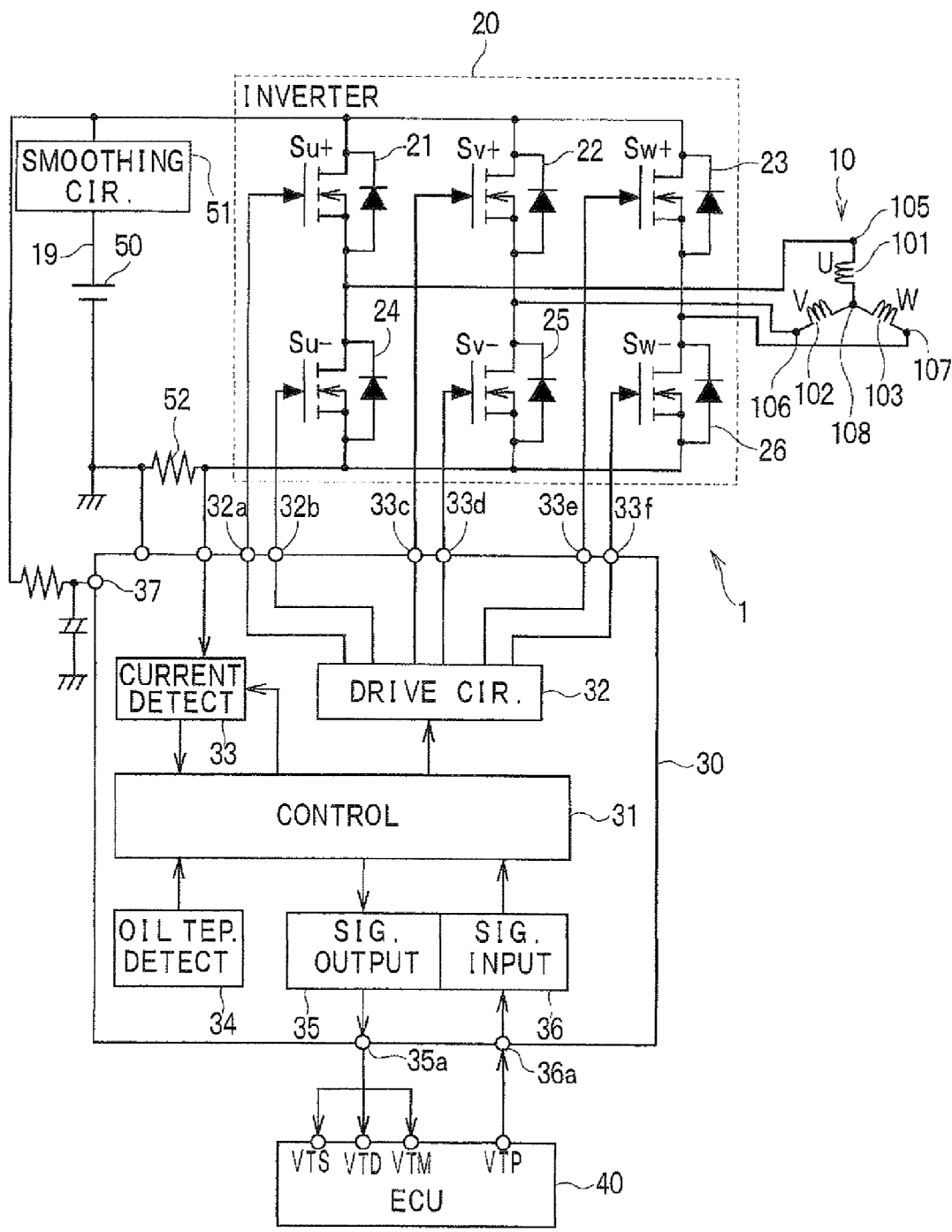
FIG. 2 is a diagram illustrating an electric configuration of an electric driver unit in accordance with one embodiment.

FIG. 2 illustrates an electric configuration of the EDU 1 according to one embodiment, The EDU 1 includes an electric motor 10, an inverter 20, an integrated circuit (IC) 30, and an electronic control unit (ECU) 40.

As described above, the electric motor 10 is for example a three-phase brushless motor, and includes the stator and the rotor. The stator has projection parts which are arranged at predetermined angle intervals and which respectively project in radially inward directions. Three phase coils 101, 102, 103 are wound around the projection parts. More specifically, a U phase coil 101, a V phase coil 102 and a W phase coil are wound around the projection parts.

The inverter 20 includes six MOFETs 21, 22, 23, 24, 25, 26 (metal oxide semiconductor field effect transistors). The MOFETs 21 to 26 function as switching elements. Depending on a gate electric potential of each MOSFET 21 to 26, an electric connection between a drain and a source of the MOSFET 21 to 26 is switched ON (conductive) or OFF (non-conductive), The MOSFETs 21 to 26 may be also simply referred to hereinafter as FETs 21 to 26. Further, for distinctively describing the six FETs 21 to 26, the six FETs 21 to 26 may be also referred to a FET (Su+) 21, a FET (Sv+) 22, a FET (Sw+) 23, a FET (Su−) 24, a FET (Sv−) 25 and a FET (Sw−) 26, respectively, as shown in FIG. 2.

Explanation is given below on connection of the FETs 21 to 26. Drains of three FETs 21 to 23 are connected with a smoothing circuit 51. An external power supply 50 is connected with the smoothing circuit 51 via a power supply terminal 19 (see FIG. 1). Accordingly, the power can be supplied to not only the inverter 20 but also the IC 30 and the ECU 40.

Sources of the FETs 21 to 23 are connected with drains of the FET 24 to 26, respectively. Sources of the FETs 24 to 26 are grounded via a shunt resistor 52. Accordingly, a current flowing in the inverter 20 can be extracted as an electric potential of a line that interconnects between the inverter 20 and the shunt resistor 52.

A connection point between the FET (Su+) 21 and the FET (Su−) 24 is connected with one end 105 of the U phase coil 101. A connection point between the FET (Sv+) 22 and the FET (Sv−) 25 is connected with one end 106 of the V phase coil 102. A connection point between the FET (Sw+) 23 and the FET (Sw−) 26 is connected with one end of 107 of the W phase coil 103. The other ends 108 of the U phase coil 101, the V phase coil 102 and the W phase coil 103 are connected to each other to establish a star connection.

The IC 30 includes a drive circuit 32, a current detection part 33, an oil temperature detection part 34, a signal output part 35 and a signal input part 36, and a control circuit 31 connected with the forgoing parts. The above components operate by the power supplied via the power supply terminal 37 of the IC 30. The control circuit 31 controls the drive circuit 32 and thereby drives the inverter 20. The signal input part 36 inputs a signal indicative of target revolutions and a target rotation direction to the control circuit 31. The control circuit 31 controls the drive circuit 32 so that the electric motor rotates at the target revolutions. In parallel with the above control, the control circuit 31 performs current control based on current information provided from the current detection part 33. To the signal output part 35, the control circuit 31 outputs a monitor signal associated with monitoring the electric motor 10, a signal indicative of actual revolutions of the electric motor, and a signal indicative of an actual rotation direction of the motor.

The drive circuit 32 is connected with the FETs 21 to 26 via terminals 32a, 32b, 32c, 32d, 32e, 32f. One of functions of the drive circuit 32 is a voltage step up function. Via the drive circuit 32, the FETs 21 to 26 are switched ON and OFF.

The current detection part 33 includes a comparator as a main component. The current detection part 33 compares a voltage value of the shunt resistor 52 to a reference voltage value, and outputs a signal with a high level when the voltage value of the shunt resistor 52 exceeds the reference voltage value. In the present embodiment, a first reference voltage value corresponding to a current value of "20 A" or a second reference voltage value corresponding to a current value of "30 A" is set as the reference voltage value. Based on the oil temperature information provided from the temperature detection part 34, it is determined whether the reference voltage value is set to the first reference voltage value or the second reference voltage value.

Figure 3:
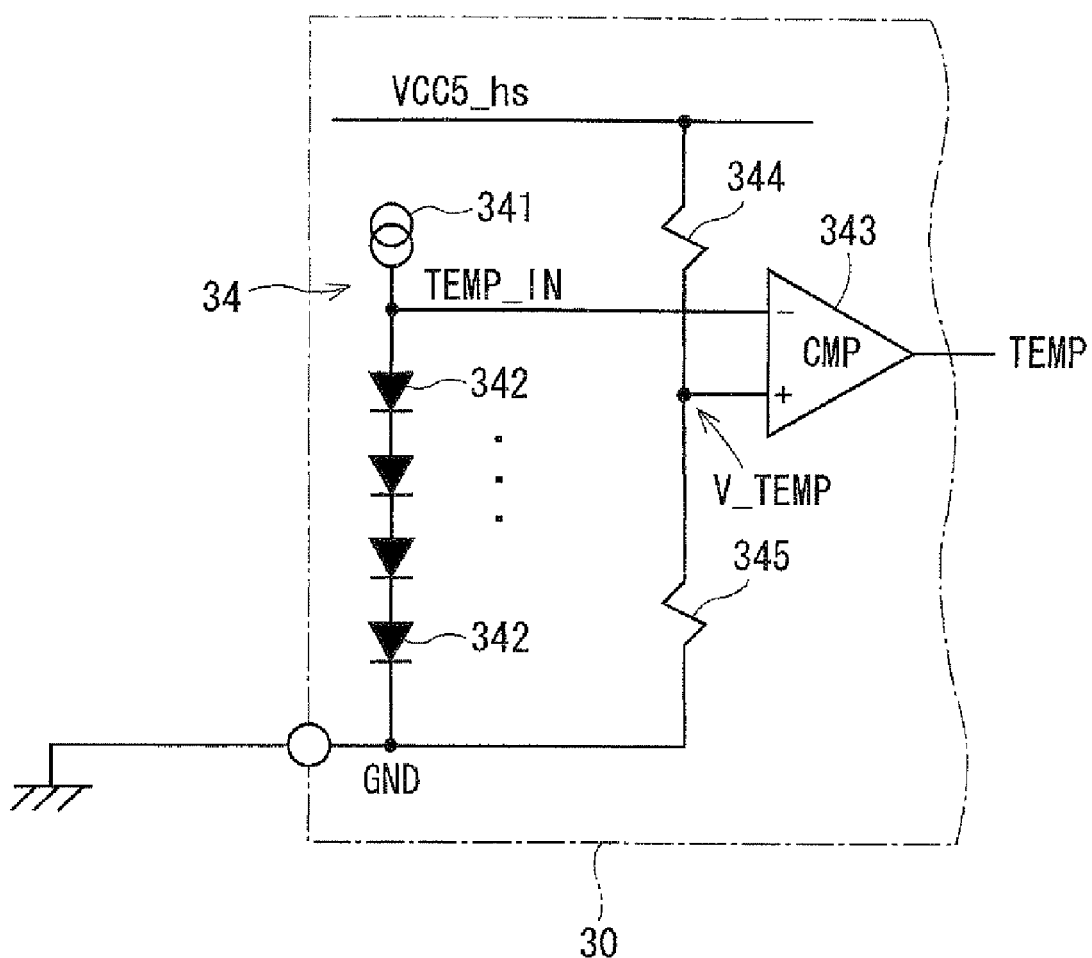
FIG. 3 is a circuit diagram illustrating a temperature detection part in accordance with one embodiment.

The oil temperature detection part 34 is provided by utilizing components of the IC 30. Main components of the oil temperature detection part 34 may be a diode for temperature protection and a comparator. More specifically, as shown in FIG. 3, multiple diodes 342 are connected in series with each other between a constant current source 341 and a ground potential. A connection point (see TEMP_IN in FIG. 3) between the constant current source 341 and the diode 342 is connected with a negative terminal of the comparator 343. Two resistors 344, 345 are connected in series between a power supply potential and a ground potential. A connection point (see V_TEMP in FIG. 3) between the two resistors 344 and 345 is connected with a positive terminal of the comparator 343. According to the above configuration, a reference voltage value corresponding to "a predetermined temperature" is inputted to the positive terminal of the comparator 343. In the present embodiment, the resistors 344, 345 are provided so that a reference voltage value corresponding to a temperature of 40 degrees C. is input.

A potential difference across the diode 342 becomes large at high temperatures and small at low temperatures. When the temperature of a surface of a circuit board or the IC 30 is increased to high temperatures, an electric potential of the negative terminal of the comparator 343 becomes smaller than that of positive terminal of the comparator 343, and a signal with a high level is outputted from an output terminal of the comparator 343. When, on the contrary, the temperature of a surface of a circuit board or the IC 30 is decreased to low temperatures, an electric potential of the negative terminal becomes larger than that of positive terminal, and the signal with the low level is outputted. More specifically, in the present embodiment, when the surface temperature of the circuit board exceeds 40 degrees C., the signal with the high level is outputted. When the surface temperature of the circuit board falls down 40 degrees, the signal with the low level is outputted.

Description returns to FIG. 2. The signal output part 35 is connected with the ECU 40 via the output terminal 35a of the IC 30, and can output three kinds of signals to the ECU 40. The ECU 40 inputs a signal to the signal input part 36 via the input terminal 36a.

The ECU 40 may include a known microcomputer. The three kinds of input signals inputted to the ECU 40 via the output terminal 35a of the IC 30 are a VTS signal, a VTD signal and a VTM signal. The VTS signal indicates actual revolutions of the electric motor 10. The VTD signal indicates a rotation direction of the electric motor 10. The VTM signal is a monitor signal associated with the monitoring of the electric motor 10. The output signal from the ECU 40 includes a VTS signal indicative of target revolutions of the electric motor 10, and is inputted to the IC 30 via the input terminal 36a of the IC 30. The ECU 40 performs constant monitoring of a rotation state of the electric motor 10 based on the three kinds of signals, and outputs the target revolutions to the IC 30.

In the present embodiment, the control circuit 31 operates as follows. When the temperature detection part 34 outputs the signal with the low level, in other words, when the surface temperature of the circuit board is lower than the 40 degrees C., the control circuit 31 outputs the second reference voltage value, which corresponds to the current value of "30 A", to the current detection part 33. In the above case, when the signal outputted from the current detection part 33 becomes the high level, in other words, when the current flowing through the shunt resistor 52 exceeds "30 A", the control circuit 31 controls the drive circuit so that the power distribution to the inverter 20 is cut. More specifically, the FETs 21 to 26 is switched OFF. When the value of the current flowing through the shunt resistor 52 then falls down, the power is distributed to the inverter again. Through the above operations, the current flowing in the inverter 20 is maintained at approximately "30 A". That is, when the surface temperature of the circuit board is smaller than 40 degrees C., the current of "30 A" flows in the inverter 20.

When the temperature detection part 34 outputs the signal with the high level, in other words, when the surface temperature of the circuit board is higher than the 40 degrees C., the control circuit 31 outputs the first reference voltage value, which corresponds to the current value "20 A", to the current detection part 33. In the above case, when the signal outputted from the current detection part 33 becomes high level, in other words, when the current flowing through the shunt resistor 52 exceeds "20 A", the control circuit 31 controls the drive circuit and cuts the power distribution to the inverter 20. More specifically, the FETs 21 to 26 is switched OFF. When the value of the current flowing through the shunt resistor 52 then falls down, the power distribution to the inverter 20 is started again. Through the above operations, the current flowing in the inverter 20 is maintained at approximately "20 A". That is, when the surface temperature of the circuit board is larger than 40 degrees C., the current of "20 A" flows in the inverter 20.

The response performance of the adjusting apparatus 90 varies according to the temperature of oil that surrounds the adjusting apparatus 90. A seen above, the temperature measured by the temperature detection part 34 is the surface temperature of the circuit board. According to the present embodiment, the temperature of the surrounding oil is estimated in the below-described ways.

Figure 4:
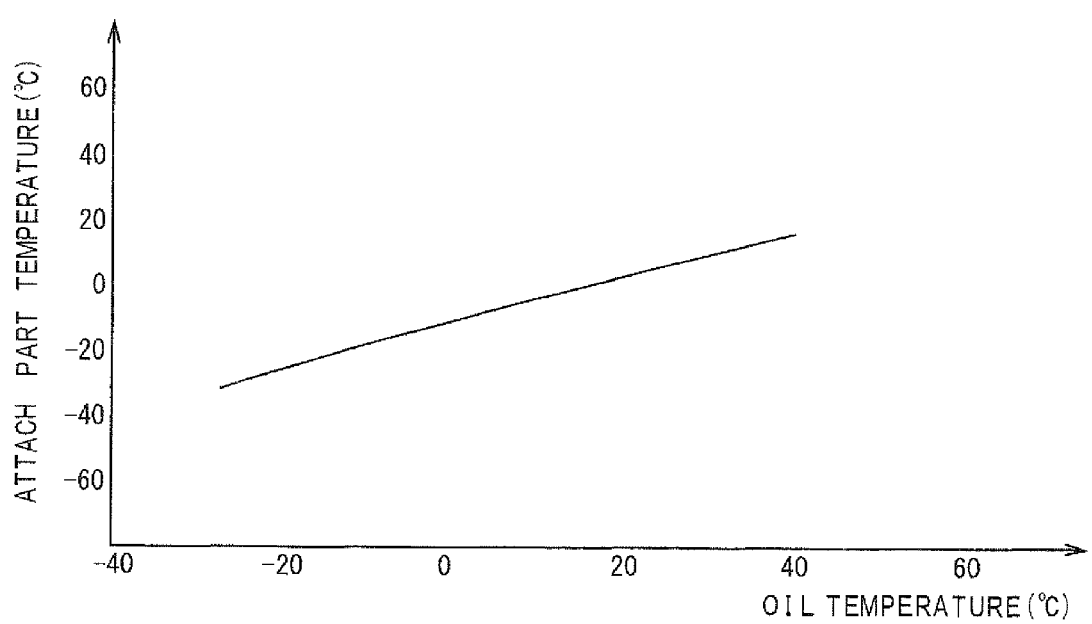
FIG. 4 is a graph illustrating a relationship between oil temperature and attach part temperature.

A surrounding of the adjusting apparatus, which is illustrated as a space "N" in FIG. 1, is filled with engine oil. According to the present embodiment, as described above, the metal base 16a of the circuit board part 16 is attached to the engine head 91 by using the bolt 13. Thus, temperature of an attach part T (see FIG. 1), which is provided by the bolt 13 and a part of the base 16a, is proportional to temperature of the engine oil filling the space N. FIG. 4 illustrates an exemplary relationship between the temperature of the engine oil and the temperature of the attach part T. As shown in FIG. 4, the attach part temperature and the oil temperature vary in a similar manner, and the attach part temperature is always lower than the oil temperature. Since the base 16a serving as the attach part T is made of metal, the surface K (see FIG. 1) of the circuit board has the substantially same temperature as the attach part T. Hence, in the present embodiment, it is possible to perform the control based on the signal from the temperature detection part 34, which detects the temperature of the surface K of the circuit board.

Advantages of the EDU 1 according to the present embodiment will be described below. For ease in understanding the advantages, a comparison example is described below first. In a comparison example, the drive current is always maintained at a single constant value by temporarily cutting power distribution to the electric motor, from a viewpoint of the heat generation suppression in MOSFETs. However, the response performance of an adjusting apparatus according to the comparison example is worsened when the engine is cool. This is because the temperature of the oil surrounding the adjusting apparatus is a factor of worsening the response performance.

The present embodiment addresses the above disadvantage of the comparison example in the following ways. When the signal outputted from the current detection part 33 has the high level, the drive circuit is controlled so that the power distribution to the inverter 20 is temporarily cut. Further, when the surface temperature of the circuit board is larger than 40 degrees C., the control is performed so that a current of "20 A" flows in the inverter 20. When the surface temperature of the circuit board is smaller than 40 degrees C., the control is performed so that an excess current of "30 A" flows in the inverter 20.

In other words, until the oil temperature reaches a predetermined temperature, a large current (referred to also as an excess current), which is larger than a normal current in a normal state, flows. It is thereby possible to suppress a decrease in response performance of the adjusting apparatus 90 driven by the motor. In addition, the flow of the excess current does not bring a problem associated with the heat generation. This is because the adjusting apparatus is cool when the oil temperature is low, more specifically when the surface temperature of the circuit board is lower than 40 degrees C.

Figure 5:
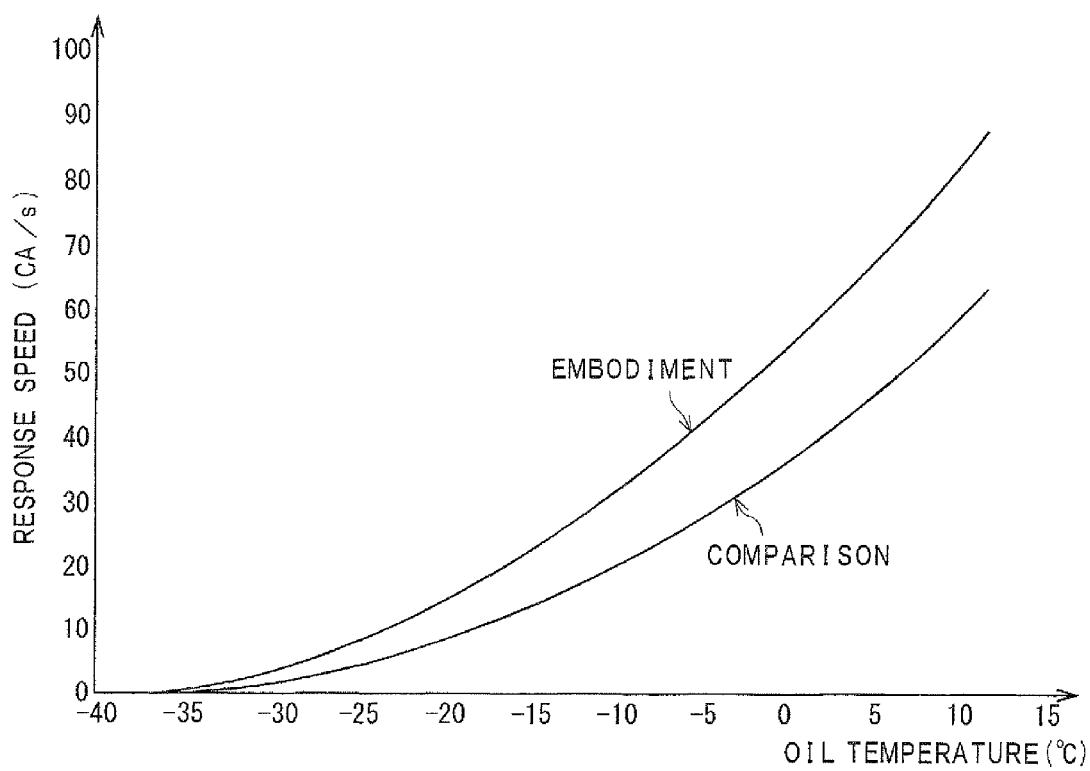
FIG. 5 is a graph illustrating a relationship between oil temperature and response speed.

FIG. 5 illustrates the response performance of the adjusting apparatus 90. The horizontal axis of the graph indicates oil temperature (degree C.), and the vertical axis indicates response speed (CA/s). A lower curve and an upper curve indicate the comparison example and the present embodiment, respectively. As shown in FIG. 5, when the excess current of "30 A" flows in the inverter 20 in a low oil temperatures range, the response performance improves by a factor of 1.5 compared to the comparison example.

In the present embodiment, a part of the IC 30 provides the temperature detection part 34. Further, the temperature detected by the temperature detection part 34 is always lower than the oil temperature. Thus, by performing the control on an assumption that the detected surface temperature of the circuit board is identical to the oil temperature, the control can be performed in a safer manner in respect of the problem associated with the heat generation. Further, since the adjusting apparatus needs not to have an element for directly measuring the oil temperature, it is possible to simplify the adjusting apparatus.

The above described embodiment can be modified in various ways, examples of which are described below.

Figure 6:
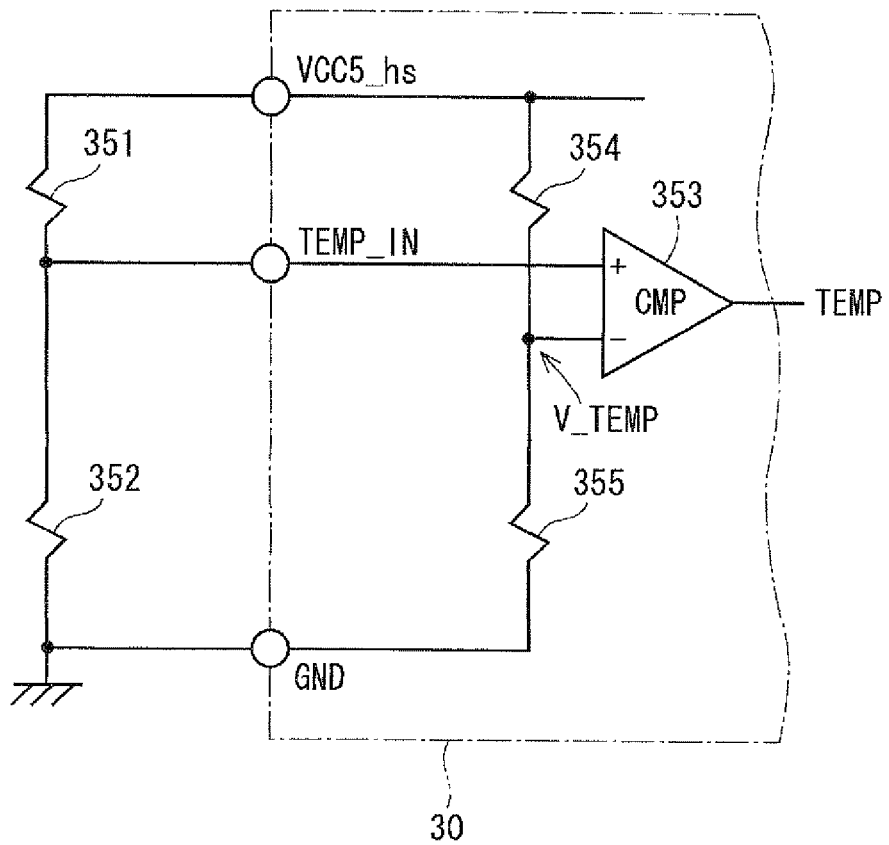
FIG. 6 is a circuit diagram illustrating a temperature detection part in accordance with a modification example.

(1) In the above embodiment, the temperature detection part 34 is provided by utilizing a diode 342 of the IC 30. Alternatively, as shown in FIG. 6, the temperature detection part 34 may have the following configuration. A thermistor 351 and a resistor 352 are connected in series between a power supply potential and a ground potential. A connection point (see TEMP_IN in FIG. 6) between the thermistor 351 and the resistor 352 is connected with the positive terminal of the comparator 353 in the IC 30. In the IC 30, a resistor 354 and a resistor 355 are connected in series between the power supply potential and the ground potential. A connection point (see V_TEMP in FIG. 6) between the resistors 354 and 355 is connected with the negative terminal of the comparator 353. Since a resistance of the thermistor 351 decrease with increasing temperature, when the electric potential of the positive terminal of the comparator 353 exceeds that of the negative terminal due to a temperature increase, the output terminal of the comparator 353 outputs a signal with the high level. Even when the EDU 1 employs the above alternative configuration, the EDU 1 with the alternative configuration can have the same advantages as the above described embodiment.

Figure 7:
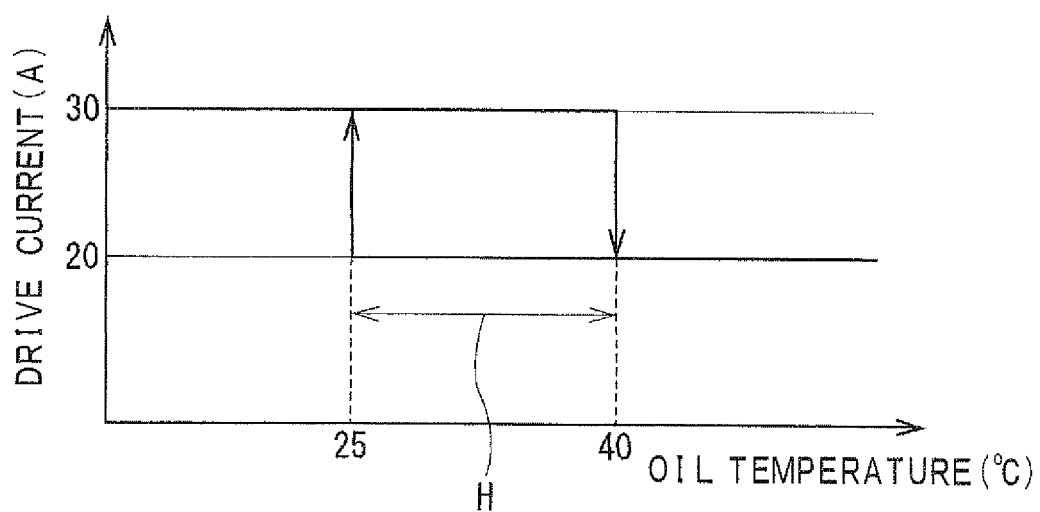
FIG. 7 is a graph illustrating hysteresis in drive current switching.

(2) In the above embodiment, based on a signal from the temperature detection part 34, the control is performed through determining whether the surface temperature of the circuit board is larger or smaller than 40 degrees C. Alternatively, the control may be performed in the following ways. As shown in FIG. 7, when the surface temperature of the circuit board is increasing, the drive current is switched from "30 A" into "20 A" at the surface temperature of 40 degrees C. When the surface temperature of the circuit board is decreasing, the drive current is switched from "20 A" to "30 A" at the surface temperature of 25 degrees C. Such hysteresis (see "H" in FIG. 7) can minimize an occurrence of hunting, even when the engine is stopped and re-started at short time intervals for instance.

In the above embodiment and modifications, the inverter 20 is an example of a switching part or means for applying a dive current to a motor. The current detection part is an example of a current information output part or means that provides current information associated with a current flowing in the switching part or means. The control circuit 31 is an example of a power distribution control part or means that controls power distribution to the motor by controlling the switching pad or means. The temperature detection part 34 is an example of an oil temperature information output part or means that provides oil temperature information, wherein the oil temperature information corresponds to an oil temperature corresponding value, wherein the oil temperature corresponding value depends on temperature of oil that surrounds the adjusting apparatus.

According to an aspect of the above embodiment and modification, an electric driver unit is provided. The electric driver unit is used for an electric valve timing adjusting apparatus that adjusts timing of opening and closing a valve of an internal combustion engine of a vehicle by using a motor. The electric driver unit includes a motor for driving the electric valve timing adjusting apparatus and a switching part for applying a drive voltage to the motor. The electric diver unit further includes a power distribution control part, a current information output part, and an oil temperature information output. The power distribution control part controls the switching part to control power distribution to the motor. In the above control, the current information output part is configured to provide current information, which depends on a current flowing in the switching part. The current information includes information that enables indirect estimation of a value of the current flowing in the switching part or means. The current information may indicate the value of the current, or indicate whether the value of the current exceeds a reference value. The oil temperature information output part provides oil temperature information, which corresponds to an oil temperature corresponding value, the oil temperature corresponding value depending on temperature of oil that surrounds the electric valve timing adjusting apparatus. The oil temperature corresponding value enables estimation of the temperature of the oil surrounding the electric valve timing adjusting apparatus. The oil information includes information that enables indirect estimation of the oil temperature corresponding value. By temporarily cutting the power distribution to the motor based on the current information provided from the current information output part, the power distribution control part is configured to control the current flowing in the switching part so that the current flowing in the switching part stays below a target current value. The target current value includes a normal current value and a predetermined large current value larger than the normal current value. The power distribution control part sets the target current value based on the oil temperature information provided from the oil temperature output part, such that the power distribution control part adopts the predetermined large current value as the target current value until the oil temperature corresponding value reaches a predetermined temperature.

According to the above electric driver unit, until the oil temperature corresponding value reaches the predetermined temperature, the current having the predetermined large current value, which is also referred to as an excess current, flows in the switching part. Thereby, it is possible to minimize the worsening of the response performance of the adjusting apparatus. Further, since the adjusting apparatus is cool when the oil temperature corresponding value is small, the predetermined current value larger than the normal current value does not bring a problem associated with the heat generation.

In the above, temperature of the adjusting apparatus varies in accordance with a driving state. When the adjusting apparatus is cool, the flow of the excess current does not bring a problem associated with heat generation. Therefore, the predetermined temperature can be determined by considering an influence of the heat generation caused by the current flowing in the switching part.

The electric driver unit may further include an integrated circuit (IC) arranged on a circuit board. The current information output part is provided as a first function of the IC. The power distribution control part is provided as a second function of the IC.

Further, the oil temperature information output part may be provided by utilizing a component of the IC. For example, the integrated circuit includes a diode for temperature protection; and the oil temperature information output part is provided by utilizing the diode of the integrated circuit. Alternatively, the oil information output part may be provided by utilizing a thermistor that is arranged on a circuit board and is located outside of the IC. According to the above configurations, surface temperature of the circuit board may be the oil temperature corresponding value. Temperature of an attach part, via which the electric driver unit is attached to the adjusting apparatus, is approximately proportional to the temperature of the oil surrounding the adjusting apparatus. Therefore, when the surface temperature of the circuit board is set to the oil temperature corresponding value, and when the surface temperature of the circuit board is assumed to be identical to the oil temperature, the control can be performed in a safer manner from viewpoint of the heat generation.

The above electric driver unit may be configured as follows. The predetermined temperature includes a predetermined lower temperature and a predetermined higher temperature higher than the predetermined lower temperature. Based on the oil temperature information, the power distribution control part switches the target current value from the predetermined large current value to the normal value when the oil-temperature-corresponding value exceeds the predetermined higher temperature. For example, the predetermined upper temperature is set to 40 degrees C., the predetermined large current value is set to 30 A, and the normal current value is set to 20 A, In these value, when the oil temperature corresponding value exceeds 40 degrees C., the target current value is switched from the 30 A to 20 A.

Further, the above electric driver unit may be configured as follows. Based on the oil temperature information, the power distribution control part switches the target current value from the normal value to the predetermined large current value when the oil-temperature-corresponding value falls below the predetermined lower temperature, For example, the predetermined lower temperature is set to 25 degrees C., the predetermined large current value is set to 30 A, and the normal current value is set to 20 A. When the oil temperature corresponding value falls below 25 degrees C., the target current value is switched from the 20 A to 30 A.

When the predetermined upper and lower current values are set as the target current value in the above described way, it is possible to provide hysteresis in the switching the target current value. Due the presence of the hysteresis, it is possible to minimize the hunting which can occur when the engine is stopped and re-started in short time intervals While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. A motor driving apparatus for an electric valve timing adjusting apparatus that adjusts timing of opening and closing a valve of an internal combustion engine by using a motor, the motor driving apparatus comprising:
    a motor that drives the electric valve timing adjusting apparatus;
    a switching part for applying a drive voltage to the motor;
    a current information output part that provides current information according to a current flowing in the switching part ;
    a power distribution control part that controls power distribution to the motor by controlling the switching part; and
    an oil temperature information output part that is configured on a circuit board, and that provides oil temperature information according to an oil temperature corresponding value, which is temperature of the circuit board and corresponds to temperature of oil surrounding the electric valve timing adjusting apparatus,
    wherein:
    the power distribution control part controls the current flowing in the switching part by temporarily cutting off the power distribution to the motor based on the current information provided from the current information output part, so that the current flowing in the switching part does not exceed a target current value; and
    based on the oil temperature information provided from the oil temperature output part, the power distribution control part adopts an excess current, which is a large current value larger than a normal current value, as the target current value during a period from when the internal combustion engine is started to when the oil temperature corresponding value reaches a predetermined temperature.

2. The motor driving apparatus according to claim 1, wherein:
    the current information output part and the power distribution control part are provided as functions of an integrated circuit.

3. The motor driving apparatus according to claim 2, wherein:
    the oil temperature information output part is configured by utilizing a configuration of the integrated circuit.

4. The motor driving apparatus according to claim 3, wherein:
    the oil temperature information output part includes a diode for temperature protection in the integrated circuit.

5. The motor driving apparatus according to claim 3, wherein:

the oil temperature information output part includes a thermistor which is arranged on the circuit board and is located outside of the integrated circuit.

6. The motor driving apparatus according to claim 1, wherein:

the predetermined temperature includes a predetermined lower temperature and a predetermined higher temperature larger than the predetermined lower temperature; and based on the oil temperature information provided from the oil temperature output part, the power distribution control part switches the target current value from the large current value to the normal value when the oil-temperature-corresponding value exceeds the predetermined higher temperature.

7. The motor driving apparatus according to claim 1, wherein:

the predetermined temperature includes a predetermined lower temperature and a predetermined higher temperature larger than the predetermined lower temperature; and based on the oil temperature information provided from the oil temperature output part, the power distribution control part switches the target current value from the normal value to the large current value when the oil-temperature-corresponding value falls below the predetermined lower temperature.

8. The motor driving apparatus according to claim 6, wherein:

based on the oil temperature information provided from the oil temperature output part, the power distribution control part switches the target current value from the normal value to the large current value when the oil-temperature-corresponding value falls below the predetermined lower temperature.

* * * * *